United States Patent
Mann

(10) Patent No.: US 10,986,146 B2
(45) Date of Patent: Apr. 20, 2021

(54) APPARATUSES, SYSTEMS, AND METHODS FOR A SPEAKER POOL

(71) Applicant: Narinder Pal Mann, Panipat (IN)

(72) Inventor: Narinder Pal Mann, Panipat (IN)

( * ) Notice: Subject to any disclaimer, the term of this patent is extended or adjusted under 35 U.S.C. 154(b) by 216 days.

(21) Appl. No.: 15/710,824

(22) Filed: Sep. 20, 2017

(65) Prior Publication Data

US 2018/0084016 A1    Mar. 22, 2018

Related U.S. Application Data

(60) Provisional application No. 62/397,184, filed on Sep. 20, 2016.

(51) Int. Cl.
| | |
|---|---|
| G06F 15/16 | (2006.01) |
| H04L 29/06 | (2006.01) |
| H04L 29/08 | (2006.01) |
| H04M 3/56 | (2006.01) |
| G06Q 30/02 | (2012.01) |
| H04N 7/15 | (2006.01) |

(52) U.S. Cl.
CPC .......... *H04L 65/403* (2013.01); *H04L 65/605* (2013.01); *H04L 67/141* (2013.01); *H04L 67/20* (2013.01); *H04M 3/56* (2013.01); *G06Q 30/0277* (2013.01); *H04M 2203/205* (2013.01); *H04M 2203/2044* (2013.01); *H04N 7/155* (2013.01)

(58) Field of Classification Search
CPC ................. H04L 51/32; G06Q 30/06
See application file for complete search history.

(56) References Cited

U.S. PATENT DOCUMENTS

| | | | | |
|---|---|---|---|---|
| 8,676,913 | B1* | 3/2014 | Roche | H04L 51/32 |
| | | | | 709/206 |
| 10,430,763 | B1* | 10/2019 | Song | G06Q 10/1053 |
| 10,489,745 | B1* | 11/2019 | Verroios | G06F 17/18 |
| 2002/0085030 | A1* | 7/2002 | Ghani | G06Q 10/10 |
| | | | | 715/751 |
| 2003/0158900 | A1* | 8/2003 | Santos | H04M 7/0027 |
| | | | | 709/205 |
| 2004/0225716 | A1* | 11/2004 | Shamir | H04L 29/06 |
| | | | | 709/204 |
| 2008/0010347 | A1* | 1/2008 | Houghton | H04L 29/06027 |
| | | | | 709/205 |
| 2008/0137558 | A1* | 6/2008 | Baird | H04L 65/1083 |
| | | | | 370/260 |
| 2011/0270926 | A1* | 11/2011 | Boyd | G06Q 10/1095 |
| | | | | 709/204 |
| 2011/0314397 | A1* | 12/2011 | Ogle | H04L 12/1822 |
| | | | | 715/764 |

(Continued)

*Primary Examiner* — Umar Cheema
*Assistant Examiner* — Tesfu N Mekonen
(74) *Attorney, Agent, or Firm* — Kunzler Bean & Adamson, PC

(57) ABSTRACT

Apparatuses, systems, and methods are disclosed for a speaker pool. A method includes receiving electronic consent from a plurality of speakers over an interface with a third party for the speakers to join a speaker pool. A method includes receiving criteria for selecting one or more speakers from a speaker pool from a third party via a hook in an interface. A method includes electronically displaying a selected one or more speakers from a speaker pool to a visitor of a third party using a hook in an interface based on received criteria.

20 Claims, 11 Drawing Sheets

(56) References Cited

U.S. PATENT DOCUMENTS

| | | | |
|---|---|---|---|
| 2012/0182384 A1* | 7/2012 | Anderson | H04L 12/1827 348/14.09 |
| 2014/0045472 A1* | 2/2014 | Sharma | H04W 4/08 455/416 |
| 2014/0180715 A1* | 6/2014 | Phillips | G06F 19/3418 705/2 |
| 2015/0301720 A1* | 10/2015 | Gottlieb | H04L 65/4038 715/753 |
| 2015/0304436 A1* | 10/2015 | Vaccari | G06F 16/9537 709/204 |
| 2015/0319203 A1* | 11/2015 | Jeremias | H04L 51/20 715/753 |
| 2016/0247123 A1* | 8/2016 | Holst | G06Q 10/1095 |
| 2017/0046406 A1* | 2/2017 | Ganesan | G06F 16/951 |

\* cited by examiner

US 10,986,146 B2

APPARATUSES, SYSTEMS, AND METHODS FOR A SPEAKER POOL

CROSS-REFERENCES TO RELATED APPLICATIONS

This application claims the benefit of U.S. Provisional Patent Application No. 62/397,184 entitled "APPARATUSES, SYSTEMS, AND METHODS FOR A SPEAKER POOL" and filed on Sep. 20, 2016 for Narinder Pal Mann, which is incorporated herein by reference.

FIELD

The present disclosure relates to a speaker pool, and, in certain embodiments, more specifically relates to presentation of one or more speakers of a speaker pool who have consented to participate in one or more discussion topics via a hook in a third-party interface.

BACKGROUND

Individuals may rely on their personal networks to find a person knowledgeable enough to answer their questions, evaluate various options, and/or provide specific suggestions rather than generic advice. Many times, individuals may not be fortunate enough to find such a person in their personal network and may instead compromise for sub-par, if not wrong, advice. Thereafter, they may end their efforts to seek inputs from a knowledgeable person. Or, a few courageous individuals may resort to other sources, like the Internet, to find such a person online, but may face multifold challenges—such as how to identify such a person, how to reach to such a person once identified, how to convince this person to join in a discussion, and how to engage them during discussion.

SUMMARY

Other aspects and advantages of the disclosure will become apparent from the following detailed description, taken in conjunction with the accompanying drawings, illustrating by way of examples the principles of the disclosure.

Methods for a speaker pool are presented. In one embodiment, a method includes receiving electronic consent from a plurality of speakers over an interface with a third party. Consent, in certain embodiments, is for speakers to join a speaker pool. A method, in a further embodiment, includes receiving criteria for selecting one or more speakers from a speaker pool from a third party via a hook in an interface. A method, in one embodiment, includes electronically displaying selected one or more speakers from a speaker pool to a visitor of a third party using a hook in an interface based on received criteria.

Apparatuses for a speaker pool are presented. A settings module, in one embodiment, is configured to provide an embeddable hook for displaying a speaker pool in an interface of a third party based on one or more settings defined for the hook. In certain embodiments, a participant interaction module is configured to determine that a visitor has selected a call-to-action from an embeddable hook. An interface loading module, in a further embodiment, is configured to present one or more forms corresponding to a selected call-to-action to obtain information associated with a speaker pool from a visitor.

Systems for a speaker pool are presented. A first hardware server, in one embodiment, comprises a hook for accessing a speaker pool interface so that one or more speakers of the speaker pool are displayed within a webpage provided to a user at least partially by the first hardware server. A second hardware server, in certain embodiments, selects one or more speakers of a speaker pool for display within a webpage based on a determined location for a user in response to the user visiting the webpage. A second hardware server, in a further embodiment, provides one or more speakers for display within a webpage using a hook in a speaker pool interface and a user selects a speaker from displayed one or more speakers for a discussion session between at least the user and the selected speaker.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the disclosure is not limited to specific methods and instrumentalities disclosed herein. Moreover, those in the art will understand that the drawings are not to scale. Wherever possible, like elements have been indicated by identical numbers.

DETAILED DESCRIPTION

Figure 1:
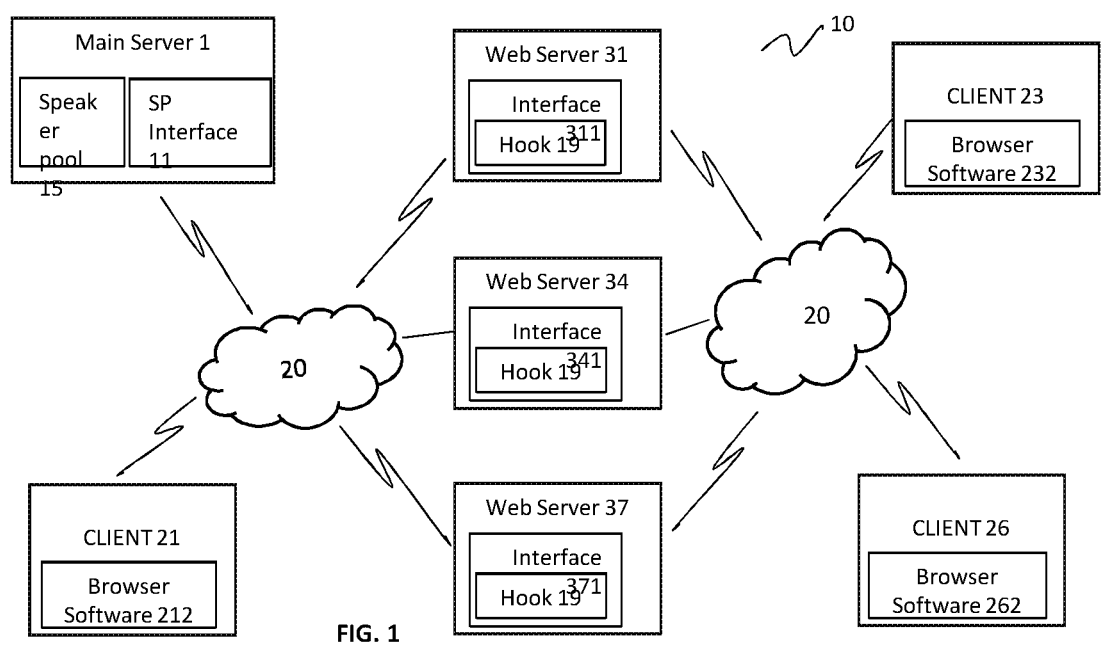
FIG. 1 is an example of a distributed system configured as client/server architecture used in an embodiment of the present disclosure.

Methods and systems for speaker pool as a service are disclosed. The following description is presented to enable any person skilled in the art to make and use the teachings of the present disclosure. For purposes of explanation, specific nomenclature is set forth to provide a thorough understanding of the present disclosure. Descriptions of specific applications are provided only as examples. Various modifications to the preferred embodiments will be readily apparent to those skilled in the art, and the general principles defined herein may be applied to other embodiments and applications without departing from the spirit and scope of the disclosure. Thus, the present disclosure is not intended to be limited to the embodiments shown, but is to be accorded the widest scope consistent with the principles and features disclosed herein.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter. As will be appreciated by one skilled in the art, aspects of the present invention may be embodied as a system, method, and/or computer program product. Accordingly, aspects of the present invention may take the form of an entirely logic hardware embodiment, an entirely software embodiment (including firmware, resident software, micro-code, or the like) or an embodiment combining software and logic hardware aspects that may all generally be referred to herein as a "circuit," "module," or "system." Furthermore, aspects of the present invention may take the form of a computer program product embodied in one or more computer readable storage medium(s) having program code embodied thereon.

Many of the functional units described in this specification have been labeled as modules, in order to more particularly emphasize their implementation independence. For example, a module may be implemented as a logic hardware circuit comprising custom VLSI circuits or gate arrays, off-the-shelf semiconductors such as logic chips, transistors, or other discrete components. A module may also be implemented in programmable logic hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer readable medium(s).

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory ("RAM"), a read-only memory ("ROM"), an erasable programmable read-only memory ("EPROM" or Flash memory), a static random access memory ("SRAM"), a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Applications, software programs or computer readable instructions may be referred to as components or modules. Applications may be hardwired or hard coded in hardware or take the form of software executing on a general purpose computer such that when the software is loaded into and/or executed by the computer, the computer becomes an system for practicing the disclosure, or they are available via a web service. Applications may also be downloaded in whole or in part through the use of a software development kit or a toolkit that enables the creation and implementation of the present disclosure. In this specification, these implementations, or any other form that the disclosure may take, may be referred to as techniques. In general, the order of the steps of disclosed processes may be altered within the scope of the present disclosure.

In the present disclosure, the term "speaker" refers to an individual whose advice, views, help, consultancy, or the like is sought via including but not limiting to, audio conference calls, video conference calls, and/or asynchronous discussions (e.g., text, e-mail, chat, or the like). The speaker is featured in a hook displayed in an interface, for example, a website, a mobile application, a desktop application, or the like. The term "visitor" refers to an individual who visits an interface that embeds the hook using a client device. The visitor may seek help, guidance, or the like of one or more speakers. The term "volunteer" refers to an individual who participates in a discussion session and/or speaker pool voluntarily. The term "participant" refers to a visitor who has enrolled for a one-to-one discussion and/or a discussion session hosted and/or advertised by the speaker pool. The term "third-party" refers to a computer hardware device (e.g., a server or other device comprising one or more processors, volatile memories, non-volatile storage devices, network interfaces, or the like) of a subscriber of a speaker pool. A third party may be located in a separate geographical location than a server for a speaker pool (e.g., a different data center), may be owned by a different entity (e.g., an educational institution) than a server for a speaker pool, or the like. A third party may embed the hook of the speaker pool in its interface for example, university interfaces, discussion forums, high-school interfaces, or the like.

Referring now to the drawings, FIG. 1 is an example of a distributed system 10 configured as a client/server architecture used in an embodiment of the present disclosure. The system 10 includes a main server 1 and a plurality of third party web servers (31, 34, and 37) communicating over a network 20. The main server 1 may also communicate with a client 21 directly over the network 20. The web servers (31, 34 and 37) communicate with one or more clients (23 and 26) through the network 20. The network 20 will be hereinafter generally referred to as the Internet. Although the system and method of the present disclosure is specifically useful for the Internet, it should be understood that the main server 1, web servers (31, 34, and 37) and clients (21, 23, and 26) may communicate with each other through one of a number of different types of networks. Such networks may include without limitation local area networks (LANs), other wide area networks (WANs), and regional networks accessed over telephone lines, such as commercial information services.

The main server 1 may be a remote computer system that is accessible over the network 20 such as the Internet. The main server 1 may comprise a hardware server including one or more processors, memories, input/output devices, and a network interface, such as a modem. The main server 1 may communicate with one or more server processes (of for example, web servers (31, 34, or 37)) or a client process of for example, client 21 over the network 20 that allows multiple servers/clients to take advantage of the information-gathering capabilities of the main server 1. The main server 1 essentially acts as an information provider for the web servers (31, 34, or 37).

The main server 1 hosts a speaker pool module 15 which, in one embodiment, receives, maintains, and/or provides details of multiple speakers who have electronically consented to discuss one or more topics. The speaker pool module 15 may receive speakers via a speaker pool interface or a third-party interface. The speaker pool module 15 may receive speakers from administrators of third-party interfaces, volunteers, invitees, or the like. In addition, the speaker pool module 15 may facilitate discussion sessions/conferences between speakers and clients (21, 23, and 26). The speaker pool module 15, when queried by a web server (31, 34, or 37) via a hook 19 provides details of the data record being queried depending upon configuration settings of the hook 19 used by a requesting client. The hook includes without limitation a widget, a browser extension, a plugin, an application programming interface (API) of a web server (31, 34, or 37), an iFrame and a Java object. The interface includes without limitation a website, a web application, a web server API based UI and an iFrame. It will be appreciated from the description below that the system and method of the present disclosure may be implemented in software that is stored as executable instructions on a computer storage medium, such as memories or mass storage devices, on the main server 1. Further details of the speaker pool module 15 are as described in FIG. 2.

The web servers (31, 34, and 37) host one or more web pages of the respective interfaces (311, 341, and 371). Each of these interfaces (311, 341, and 371) embeds the hook 19 that enables the interfaces (311, 341, and 371) to communicate with the main server 1. For example, in certain embodiments, the web servers (31, 34, and 37) may comprise third party web servers (31, 34, and 37) which may host and/or embed one or more interfaces (311, 341, and 371) from the main server 1 associated with one or more speaker pools. Communications between the main server 1 and the web servers (31, 34, and 37) may be initiated via the hook 19. Each of the web servers (31, 34, and 37) may comprise one or more hardware servers including one or more processors, memories, input/output devices, and a network interface, such as a modem.

Administrators of interfaces (311, 341, and 371) define settings in the main server 1 and determine for example, the appearance of the hook 19 in their interfaces, the place where the hook 19 shall appear, the speakers to be featured, sorting order of the speakers, announcement of one or more discussion sessions, or the like. Based on the hook 19 settings (e.g., configuration data) by the administrator of an interface, one or more visitors that visit the interface (311, 341 or 371) may be able to search for a speaker, discussion session, or the like in the hook 19. The visitors may act as volunteers and provide one or more of speaker data or consent to participate in a discussion session. Other hook 19 settings (e.g., configuration data) may include without limitation the layout of the hook 19, criteria to obtain a speaker(s) from a speaker pool and feature the speaker(s) in the hook 19 with or without administrator's approval, enabling speaker search for visitors, defining attributes for advanced search, ranking the order of speakers as per a predefined criteria, permitting visitors to feed one or more speaker profiles, marking a speaker as fraudulent, spam, not a good fit, or the like, as explained later in the description. Administrators of interfaces (311, 341 and 371) may also contribute one or more speakers to a speaker pool managed by the speaker pool module 15 and set rules for (not) showing their contributed speaker on predefined interfaces. Further details will be provided in the following description.

The web servers (31, 34 or 37) may also communicate with each other. For example, client 23 clicks on a speaker featured in hook 19 on web server 34 for more details. If web server 31 is the server that provided the speaker details and also has the hook 19 installed, then the hook 19 on the web server 34 redirects the client 23 to interface 311 hosted on the web server 31. Hook 19 in interface 311 detects this redirection and displays the speaker details that the client 23 requested. Further, if the client 23 logs-in the hook 19 on web server 34 and later visits web server 31, then the hook 19 on the web server 31 detects the logged in client 23. This helps to personalize the speaker details shown to client 23 in the hook 19 on the web server 31 (e.g., a second hook 19 in a second interface 31 on a different web server 31 may display/present corresponding speaker details). In an embodiment, instead of redirecting, web server 34 may open interface 311 in a new window and display speaker details in hook 19 on interface 311.

The clients (23, 26, and 21) can be conventional personal computers (PCs), workstations, or computer systems of any other size. For example, client 23 maybe a laptop, client 26 may be a smartphone, while client 21 may be a desktop. Each client (23, 26, or 21) may include one or more processors, memories, input/output devices, and a network interface, such as a modem. A "client" may be considered as a member of a class or group that uses the services of another class or group to which it is not related. In the context of a computer network, such as the Internet, a client is a process (i.e. roughly a program or task) that requests a service which is provided by another process, known as a server program. The client process uses the requested service without having to know any working details about the server program or the server itself. In networked systems, a client process usually runs on a computer that accesses shared network resources provided by another computer running a corresponding server process. However, it should also be noted that it is possible for the client process and the server process to run on the same computer.

The clients (23 and 26) communicate through the network 20 with web servers (31, 34 or 37) using the functionality provided by a HyperText Transfer Protocol (HTTP), although other communications protocols, such as File Transfer Protocol (FTP), Simple Network Management Protocol (SNMP), TELNET, and a number of other protocols known in the art, may be used. Similarly, client 21 may communicate with the main server 1 using the functionality provided by any of the aforesaid protocols.

The clients (23, 26 and 21) can execute web browser programs (232, 262 and 212) respectively, such as the Internet Explorer, Firefox, Chrome, Safari or Opera, desktop or mobile applications built for Windows, Mac, iOS, Android, Blackberry, browser extensions and add-ons or the like to locate web pages or records stored on one or more servers (1, 31, 34 and 37). The web pages displayed by clients (23, 26 and 21) embed and present the hook 19 via which one or more visitors access a speaker pool of the speaker pool module 15. The web pages can be data records including plain textual information, or more complex digitally encoded multimedia speaker, such as software programs, graphics, audio signals, videos, and so forth.

Once the web page is received and displayed by the browser program (232, 262 or 212), the browser program (232, 262 or 212) utilizes the reference to the hook 19 to securely request the code of hook 19 from the main server 1. Thereafter, the browser program (232, 262 or 212) executes the code of the hook 19 to construct a presentation of hook 19 within the web page. The visitor can then use the hook 19 to perform any of the functions as explained in the description below.

Figure 2:
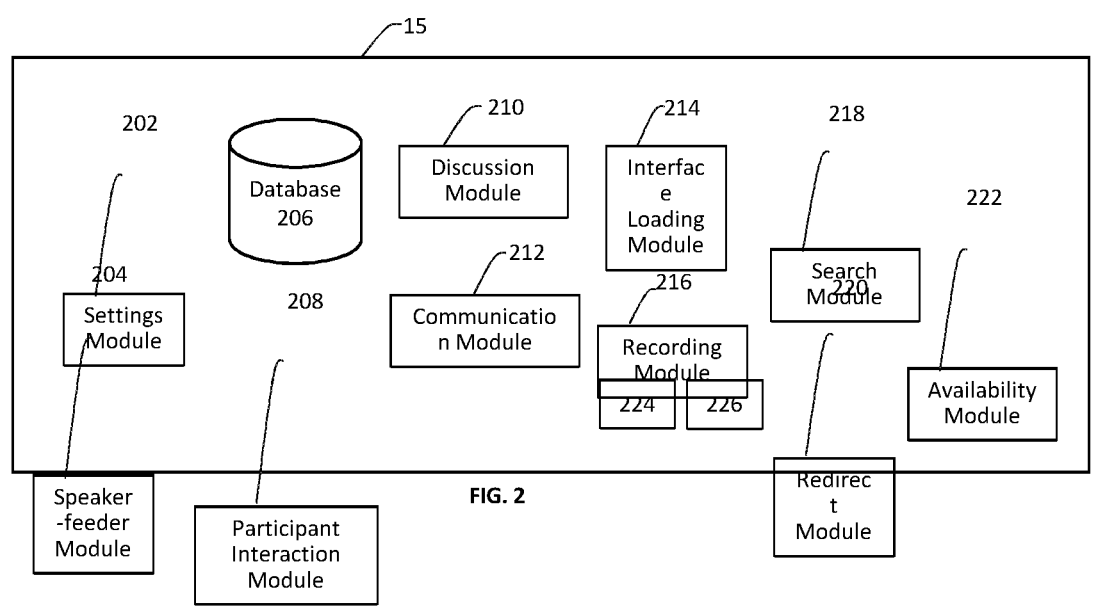
FIG. 2 is an exemplary modular diagram of a speaker pool hosted on a main server.

FIG. 2 is an exemplary modular diagram of the speaker pool module 15. The speaker pool module 15 includes a settings module 202, a speaker-feeder module 204, a database 206, a participant interaction module 208, a discussion module 210, a communication module 212, an interface loading module 214, a recording module 216, a search module 218, a redirect module 220, and an availability module 222. In other embodiments, the speaker pool module 15 may comprise a subset of one or more of the depicted modules 202, 204, 206, 208, 210, 212, 214, 216, 218, 220, 222, one or more additional modules, or the like.

The settings module 202, in one embodiment, deals with requests from one or more web servers (31, 34, and 37) on which, the respective interfaces are hosted, to implement the hook 19. For example, the request may be received from the web server 31 in case the hook 19 is to be embedded in the interface 311. The request may contain configuration data such as, for example, the uniform resource locator (URL) or other internet address of the interface on which the hook is to be embedded, name of the entity, type of subscription requested, setting preferences, payment details, or the like. The settings module 202 provides the hook code to be embedded in the code of the interface. In an embodiment, the hook code may vary based upon information received with the request.

Optionally and additionally, the settings module 202 enables an administrator to specify the criteria (e.g., configuration data) relating to the appearance/design of the hook 19 in their interface. Exemplary criteria or other configuration data may include, without limitation, tab name, color, image(s), icon(s), theme(s), location and dimensions of the page, or the like.

Optionally and additionally, the settings module 202 provides an option to the administrator to define one or more criteria (e.g., configuration data) that should be applied to the profiles of speakers for deciding whether a speaker is to be presented or not in the hook 19. The criteria or other configuration data may include, for example, a speaker's source for joining the speaker pool, speaker's work history, speaker's educational history, speaker's skill(s), speaker's area(s) of expertise, or the like. In addition, the settings module 202 provides an option to the administrator to specify the criteria (e.g., configuration data) to rank the speaker profiles in the hook 19. Optionally and additionally, the settings module 202 enables the administrator to specify the order in which one or more speakers are to be presented to a visitor once the visitor logs-in. The administrator may specify speaker order customization based upon a speaker/visitor comparison. The speaker/visitor comparison may be as per for example, a location, an ethnicity, a gender, educational details, work detail(s), and skills. In this manner, the settings module 202, in certain embodiments, may receive configuration data from a third-party server 31, 34, 37 over an interface 11, 311, 341, 371 indicating whether to allow a visitor or other user (e.g., from a client device 23, 26) to search one or more speakers displayed from a speaker pool, using the hook 19.

For example, in certain embodiments, a client 23 computing device of a user or other visitor may comprise a sensor and the client 23 computing device of the user or other visitor may provide a determined location for the user or other visitor to the settings module 202 and/or the main server 1 based on information from the sensor. In various embodiments, the client 23 computing device may determine a location using information from a sensor such as a global positioning system (GPS) sensor, a wireless communications adapter (e.g., using triangulation, a database of wireless network locations, a location associated with an internet protocol (IP) address, or the like), a network adapter (e.g., a location associated with an IP address, an internet service provider (ISP), or the like), an accelerometer, a compass, a gyroscope, and/or another sensor.

Optionally and additionally, the settings module 202 deals with the distribution of one or more speakers in the hook 19. For example, the settings module 202 may provide an administrator with an option to decide the number of speakers, speaker details and/or related content to be displayed, number of pages, information that needs to be shown on various pages, or the like. For example, in one embodiment, the settings module 202 may select and/or determine which speakers to display based on location information received from a client 23 computing device (e.g., selecting one or more speakers within a predefined geographical distance of a user/visitor, selecting one or more speakers who have previously lived in or been otherwise associated with a geographical location of a user/visitor, or the like).

Optionally and additionally, the settings module 202 provides an option to configure a feedback form to collect feedback of a visitor post the visitor's activity in the hook 19. The feedback form may be a default form stored by the speaker pool module 15 and/or designed by the administrator listing feedback questions to be asked from a participant. The visitor's activity includes without limitation, viewing profiles on the hook, feedback on a discussion session, or the like. The settings module 202 may further allow the administrator to configure one or more pages to gather information for example, information that needs to be sought from a visitor on various pages, one or more questions to be asked from a visitor and split of the questions in pages, or the like.

Optionally and additionally, the settings module 202 provides an option to the administrator to include a speaker-search field in the hook 19. The speaker-search field enables a visitor of the interface to shortlist one or more speakers from the multiple speakers displayed in the hook 19 using one or more search criteria. The search criteria can be specified by the administrator and includes without limitation, academic qualifications of the speaker, geographical details of the speaker, experience/expertise of the speaker and a topic of discussion. Alternately, the settings module 202 provides an option to the administrator to disable speaker-search field for specific categories of visitors. The categories include log-in status of a visitor, geography from where a visitor is accessing the hook, qualifications of a visitor, or the like.

The settings module 202, in certain embodiments, may receive one or more of the above described criteria for selecting one or more speakers from a speaker pool for display, over a hook 19 in an interface 311, 341, 371, from an administrator, from a user/visitor, or the like. The settings module 202 may provide and/or enable different selection, search, and/or display criteria to an administrator, than to another user/visitor. For example, an administrator may select and/or define which criteria (e.g., the search criteria described above) are available to a user/visitor.

The speaker-feeder module 204, in one embodiment, gathers speaker's profile details from a speaker, visitor, volunteer, or participant via one or more third-party interfaces (for example, interfaces 311, 341 or 371) and/or SP interface (interface 11). For example, the speaker-feeder module 204 may be configured to receive electronic consent from a plurality of speakers (e.g., members or prospective members of a speaker pool) over one of the interfaces 11, 311, 341, 371 with a third party 31, 34, 37, for a speaker to join a speaker pool. Electronic consent from a speaker, in various embodiments, may comprise an electronic signature, a signed consent agreement (e.g., an email attachment, a faxed document, and/or another electronic document), a record of user input to one or more graphical user interface (GUI) elements indicating consent (e.g., checking a checkbox, clicking or touching a button, or the like), and/or another electronic indication of a speaker's consent.

In addition, the speaker-feeder module 204 tracks the URL or other internet address of the source interface that provided the speaker details to be used for redirection purposes. In an embodiment, the speaker-feeder module 204 receives this data via the hook 19 that enables a speaker, visitor, volunteer, or participant to provide details via for example a URL, a questionnaire, one or more boxes configured in the hook, or the like. The speaker-feeder module 204 stores the speaker details in database 206. The speaker details include, without limitation, a speaker's electronic consent, qualifications, name, experience, photograph(s), location, gender, skills, ethnicity, contact details, or the like.

The speaker-feeder module 204 presents speakers using criteria defined by an administrator of the interface in the settings module 202. For example, in case of a university interface, the speaker-feeder module 204 may be configured to present only those speakers from the database 206 who are approved or invited by the university interface administrator. In yet another example, for a high school interface, the speaker-feeder module 204 may be configured to present all speakers from the database 206. Or for a discussion forum, the speaker-feeder module 204 may be configured to present speakers from the database 206 who have certain education background and/or work background and/or are from certain location and/or topic experts.

The speaker-feeder module 204, in certain embodiments, may enable a third-party web server 31, 34, 37, a third-party administrator, and/or a user of a client device 23, 26 to invite a prospective speaker and/or another volunteer to participate in a discussion session and/or to become a member of a speaker pool. In a further embodiment, the speaker-feeder module 204 may enable a third-party web server 31, 34, 37, a third-party administrator, and/or a user of a client device 23, 26 to solicit a prospective speaker and/or another volunteer's consent for participating in a discussion session, to becoming a member of a speaker pool, or the like. For example, the speaker-feeder module 204 may provide a prospective speaker and/or another volunteer (e.g., through the hook 19) an interface (e.g., a form, a GUI, a webpage), a URL, and/or a code to use to participate in a discussion session, to consent to being included in a speaker pool, or the like.

The speaker-feeder module 204 may receive an invited prospective speaker's electronic consent, may add the prospective speaker to a speaker pool in response to receiving the prospective speaker's electronic consent, or the like. The speaker-feeder module 204 may enable a third-party server 31, 34, 37 to receive a speaker and/or another volunteer's consent to participate in at least one discussion session, to join a speaker pool, or the like and the speaker-feeder module 204 may receive approval of the speaker and/or the other volunteer from the third-party web server 31, 34, 37 over the SP interface 11 or the like.

The participant interaction module 208, in one embodiment, is configured to enable participants and speakers to see each other and/or others participants, their profiles before, during and/or after a discussion session. The participant interaction module 208 allows a speaker to bookmark a participant they like during the discussion session. Additionally and optionally, the participant interaction module 208 allows a speaker to send emails to participants selectively or to all participants.

Additionally and optionally, the participant interaction module 208 allows participants to, for example, write cover letters or questions to a speaker, outline their projects or courses, request a one-to-one discussion session, and/or suggest their availability, write thank you notes or feedback relating to a discussion session, or the like.

Additionally and optionally, the participant interaction module 208 requires the visitor to perform an action prior to providing the visitor an access to the selected speaker. For example, the participant interaction module 208 may require a visitor to log-in to the speaker pool module 15 in order to obtain details about a speaker that the visitor has selected. Alternately, the participant interaction module 208 requires a visitor to enroll for a discussion session so that the communication module 212 may connect the visitor to the discussion session at a scheduled date/time. The visitor may enroll for the discussion session as a moderator/facilitator, an observer or an active participant.

The communication module 212 is responsible for connecting a speaker with a participant. The communication module 212 provides a participant access to the selected speaker at one or more selected times. Means of access which the communications module 212 may provide include, without limitation, a text chat, a voice chat, a short messaging service (SMS), a video chat, an in-person meeting, or the like. Voice/video chat includes video/audio in a web browser or using mobile/desktop apps, voice messages, or the like. Text chat includes asynchronous discussions via emails, chat messages, discussion forums, or the like. The communication module 212, in one embodiment, may provide an electronic discussion session between at least one speaker of a speaker pool and one or more additional users/visitors in response to the one or more additional users/visitors requesting access to the electronic discussion session via an in-person meeting, a video conference, an audio conference, a message exchange, or the like.

The discussion module 210, in one embodiment, maintains a look-up table with details of one or more discussion sessions displayed on different interfaces. The details include without limitation, name of one or more speakers, topic(s) of the discussion session, duration of the discussion session, list of participants, number of participants, mode of discussion, and details of participant(s) to be blocked. The topic of a discussion session may be received from an administrator or a speaker via the hook 19. In an embodiment, multiple discussion sessions on the same topic may be scheduled for a speaker at different times or multiple discussion sessions for a speaker with different topics may be scheduled. In an embodiment, the speaker may enroll without any expectation of being compensated monetarily.

The discussion module 210, in various embodiments, may enable a user/visitor to select multiple discussion sessions with a single speaker in an interface 311, 341, 371 of a third-party 31, 34, 37; may enable a user/visitor to select multiple discussion sessions with multiple speakers in an interface 311, 341, 371 of a third-party 31, 34, 37; may enable a user/visitor to select a same discussion session with a same speaker in multiple different third-party interfaces 311, 341, 371; may enable a user/visitor to select multiple discussion sessions with multiple speakers in multiple different third-party interfaces 311, 341, 371; or the like.

In an embodiment, the discussion module 210 receives a visitor's preferred mode of communication (for example, 'Connect via chat' or 'Connect via voice') with the connect request and accordingly, directs the communication module 212 to connect the speaker and the participant using the same. Alternately, the discussion module 210 checks with the settings module 202 whether the speakers presented in the hook 19 are to be connected via chat, voice, or the like and directs the communication module 212 to connect accordingly.

Additionally and optionally, the discussion module 210 tracks various details for example, participant details who have signed up for a discussion session, the source interface from where a participant has signed up, pending discussion sessions, initiation of a discussion session at a scheduled time, discussion session status while the discussion session is in progress, or the like. The discussion module 210 further triggers the participant interaction module 208 to obtain feedback and rating(s) from the participant(s) using the forms configured by the settings module 202 once the discussion session terminates.

Additionally and optionally, the communication module 212 manages an ongoing discussion session. The communication module 212 facilitates one-way broadcasting of voice/video or bi-directional broadcasting of voice/video as per the settings in the settings module 202. For example, a discussion session in which some participants are housed in a room and others are remote participants, the communication module 212 broadcasts voice of the speaker in the room and mutes the audio settings for the participants while it unmutes the audio settings of in-room participants with speaking rights when a speaker stops to speak.

Alternately, the communication module 212 may initiate an outbound call between one or more participants and one or more speakers. For example, in case a call drops, the communication module 212 may call back the participant. If the participant misses the call (e.g., does not join the call within a predetermined amount of time), the communication module 212 may send a text with call back instructions. Alternately, the communication module 212 initiates an outbound call to a visitor's phone if the visitor fails to join a discussion within a predetermined time.

Additionally and optionally, the communication module 212 tracks whether a participant has logged in, bandwidth of the connection, or the like and accordingly, prompts for video/audio in browser, or calls over phone. It connects participant(s) and speaker(s) such that they can see each other and other participants and their profiles before, during and after discussion session. Further, the communication module 212 receives content from a speaker for example, supplementary discussion slides, white-board, presentations, or the like and stores them in the database 206. While in discussion session, the communication module 212 configures a screen-sharing option of the speaker client so that all the participants can view the desktop of the speaker and relate to the content the speaker is speaking on. During a discussion session or otherwise, the communication module 212 may play a previous recording or transcription of the recording by a speaker. Further, depending upon configuration, the communication module 212 may terminate the discussion session at a scheduled time.

The interface loading module 214, in one embodiment, receives a request via the hook 19 in an interface when the interface is accessed. The interface loading module 214 obtains the interface's URL and hook code and checks with the database 206 whether the hook 19 can be hosted on the specified URL. If this hook code does not match for the interface (e.g., the hook code fails to satisfy one or more interface loading settings for the hook 19), the interface loading module 214 disables loading of the hook 19. In an embodiment, when the hook 19 is displayed for the first time, after the above check, the interface loading module 214 assigns administrative rights to the administrator to enable the administrator to configure various settings. The settings include settings provided by the settings module 202 as explained above.

The interface loading module 214, in certain embodiments, electronically displays one or more selected speakers from a speaker pool (e.g., presented by the speaker-feeder module 204, selected based on criteria received from an administrator and/or a user/visitor, or the like) to a visitor of a third party (e.g., a visitor of a website provided by a third party web server 31, 34, 37). For example, the interface loading module 214 may display the one or more selected speakers on an electronic display device (e.g., a light emitting diode (LED) display, a liquid crystal display (LCD), a cathode ray tube (CRT) display, an electronic ink display, a mobile device display, a computer display, or the like) using browser software 232, 262 of a client device 23, 26; may provide the one or more selected speakers over a network 20 to browser software 232, 262 for display, as part of the hook 19 or the like; and/or may otherwise electronically display the one or more selected speakers to a user/visitor.

In response to a visitor/user selecting a speaker in the hook 19 in a first interface 311, 341, 371, the interface loading module 214 may present and/or display corresponding speaker details in a second hook 19 in a second interface 311, 341, 371 provided through a different party (e.g., a different web server 31, 34, 37) that invited and/or approved the selected speaker to the speaker pool (e.g., displaying and/or providing speaker details from the party or entity 31, 34, 37 that originally processed and/or received the speaker and/or the associated speaker details). As described above, in certain embodiments, the interface loading module 214 may detect if a client 23 logs-in or otherwise accesses a hook 19 on a first web server 34 and later visits a second web server 31, and may personalize the speaker details displayed/presented to the client 23 in the hook 19 on the second web server 31 (e.g., based on a cookie, based on preferences or historical data shared between the servers 31, 34, or the like).

The interface loading module 214, in certain embodiments, may present a call-to-action (e.g., a button or other GUI element) including a call to apply for a job, apply for an educational opportunity, submit a request for a speaking session opportunity, add a job opportunity, add an educational opportunity, submit an article, provide feedback, provide a rating, add a speaker and/or a webpage to favorites, invite a user to a communications session, and/or another call-to-action. The interface loading module 214, the settings module 202, the speaker-feeder module 204, and/or the participant interaction module 208, in one embodiment, may complete an action for a call-to-action in response to a user/visitor completing one or more predefined conditions for the call-to-action set by a third-party (e.g., a web server 31, 34, 37; an administrator of a web server 31, 34, 37; or the like), such as providing information associated with the call-to-action (e.g., applying for a job or educational opportunity, scheduling a speaking session opportunity, adding a job opportunity, adding an educational opportunity, submitting an article, providing feedback, providing a rating, adding a speaker and/or webpage to favorites, inviting another user to a communications session, or the like).

The interface loading module 214, in one embodiment, is configured to prompt a user/visitor with an opportunity for fulfillment of a predefined action in response to a trigger, such as a predefined user input from the user/visitor, the user/visitor closing a widget and/or leaving a webpage, or the like. For example, the interface loading module 214 may prompt a user/visitor with an opportunity such as inviting the user/visitor to a discussion session as a speaker, a moderator, and/or a participant; giving the user/visitor one or more additional privileges for managing user submitted content; presenting a job opportunity; or the like.

The interface loading module 214 is configured to perform several other functions for an interface including without limitation, load the speaker-search field and/or advanced speaker-search features defined in settings module 202, load the respective speaker pools, discussion sessions, recordings, or the like, the hook appearance settings defined in settings module 202, one or more calls-to-action, one or more forms, or the like.

The recording module 216, in one embodiment, records at least a portion of a discussion session of one or more visitors with one or more selected speakers using the access to the selected speakers provided by the communication module 212. In an embodiment, the recording module 216 records details of calls and/or discussion session(s) of every participant including audio/video in browser, or over phone or in an application. The recording may be audio or video recording of the discussion session. Once the recording is complete, depending upon the settings specified in the settings module 202, the recording module 216 redacts the recording using an exclusion module 224 and/or transcription module 226. Alternately, on receiving a request from a speaker, visitor or participant, the recording module 216 may facilitate redaction of the audio or video recording and once complete, inform one or more visitors about the redacted recording in the hook 19.

The recording module 216 communicates with the exclusion module 224 configured to remove at least a portion of a recording of the discussion session of the visitor with the selected speaker recorded by the recording module 216 in response to a request from the speaker, interface administrator or visitor. Optionally and additionally, the recording module 216 mixes one or more videos of different participants to one video and publishes it on social sites.

Optionally, the recording module 216 communicates with the transcription module 226 which may be configured to provide an interface for a user/visitor to transcribe a recorded discussion session, to receive transcriptions of discussion sessions recorded by the recording module 216 from one or more users/visitors of the recorded discussion sessions, or the like. The transcription module 226 provides attribution to the one or more visitors, and informs visitors and/or selected speaker that transcription is complete.

The search module 218, in one embodiment, obtains one or more search parameters from the hook 19 when a visitor submits a search. The parameter may be for example, a major, a university name, a company name, an industry type, a discussion topic, skill(s) and so on. The search module 218 uses the search parameters to shortlist one or more speaker profiles that match the search parameter(s) from the speaker pool featured for the particular interface. The search module 218 returns the one or more speaker profiles to the hook 19 to display the subset of the speaker profiles.

The redirect module 220, in one embodiment, facilitates redirection to a web server that provided a speaker profile in case the speaker profile is requested. The redirect module 220 checks the details of an interface ('second interface') which provided the requested speaker profile and whether such interface (the second interface) embeds the hook 19 ('second hook'). If so, the redirect module 220 directs the hook 19 to the second hook of the second interface that provided the speaker profile, else, shows speaker profile in its hook 19.

The availability module 222, in one embodiment, maintains availability time slots of speakers, participants and/or visitors. The availability module 222 integrates one or more scheduling tools of the speakers, participants, and/or visitors with the speaker pool module 15. The scheduling tools may include without limitation, one or more of iCal, Microsoft Exchange, Google calendar, or the like. The availability module 222 provides an option to the speakers, participants and/or visitors to manually feed their (un)availability for one or more days or share their availability profile with other speakers, participants and/or visitors.

Figure 3A:
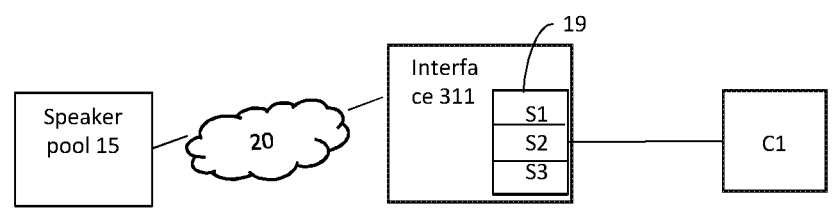
FIG. 3A depicts a first exemplary embodiment of the present disclosure.

FIG. 3A depicts a first exemplary embodiment of the speaker pool module 15. The hook 19 displays profiles of multiple speakers S1, S2 and S3 selected by the speaker-feeder module 204 in an interface, say 311. The speaker-feeder module 204 selects the speakers based upon a criteria specified by the administrator of the interface 311. Additionally and optionally, the hook 19 displays one or more discussion sessions for each speaker S1, S2 or S3. A visitor C1 accesses the interface 311 and views the profiles and/or discussion sessions of the speakers S1, S2 and S3 in the hook 19. The visitor C1 may wish to participate in discussion sessions of speaker S2 or connect one-to-one with speaker S2. Optionally, the visitor C1 may first select the profile of speaker S2 to view the profile in detail and then submit his/her preference to participate in the multiple discussion sessions or connect one-to-one with the speaker S2. The one-to-one discussion session/phone request may be for example to discuss a project, a job offer or an internship offer.

In an embodiment, the speaker pool module 15 enables the visitor to submit the preference via a user interface element for example, a 'Connect' button, a 'Connect via chat' button, a 'Connect via voice' button, or the like, displayed in the hook 19 corresponding to the profile and/or discussion sessions of the speaker S2. The participant interaction module 208 receives this selection and visitor preference, if any, via the hook 19. The participant interaction module 208 may further take one or more actions as described in FIG. 2. The discussion module 210 tracks the discussion sessions selected by the visitor C1 and triggers the communication module 212 to connect the visitor C1 to the speaker S2/discussion sessions as per the schedule.

Figure 3B:
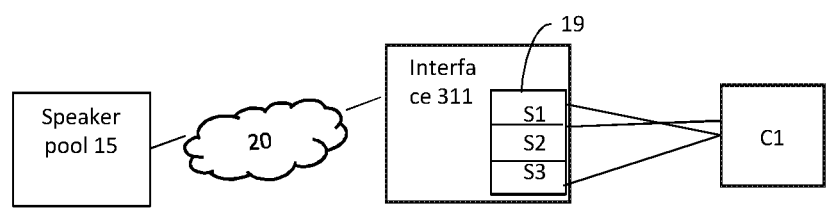
FIG. 3B depicts a second exemplary embodiment of the present disclosure.

FIG. 3B depicts a second exemplary embodiment in which a visitor C1 of the interface 311 participates in discussion sessions of multiple speakers presented in the hook 19 of the interface 311. The hook 19 displays profiles of multiple speakers S1, S2 and S3 based upon the speaker selection of the speaker-feeder module 204. Additionally and optionally, the hook 19 displays one or more discussion sessions for each speaker S1, S2 or S3. The participant interaction module 208 enables the visitor C1 to select multiple discussions sessions of speakers S1, S2 and S3 that the visitor C1 wants to participate or one or more one-to-one sessions with the speakers S1, S2 and S3. In an embodiment, one or more discussions sessions of speakers S1, S2 and S3 may be common. The discussion sessions may be for example, on same or different topics, time or location.

The participant interaction module 208 receives this selection and visitor C1 preference, if any, via the hook 19. The participant interaction module 208 may further take one or more actions as described in FIG. 2. The discussion module 210 tracks the discussion sessions selected by the visitor C1 and triggers the communication module 212 to connect the visitor C1 to the speakers S1, S2 and S3 or discussion sessions as per the schedule.

Figure 3C:
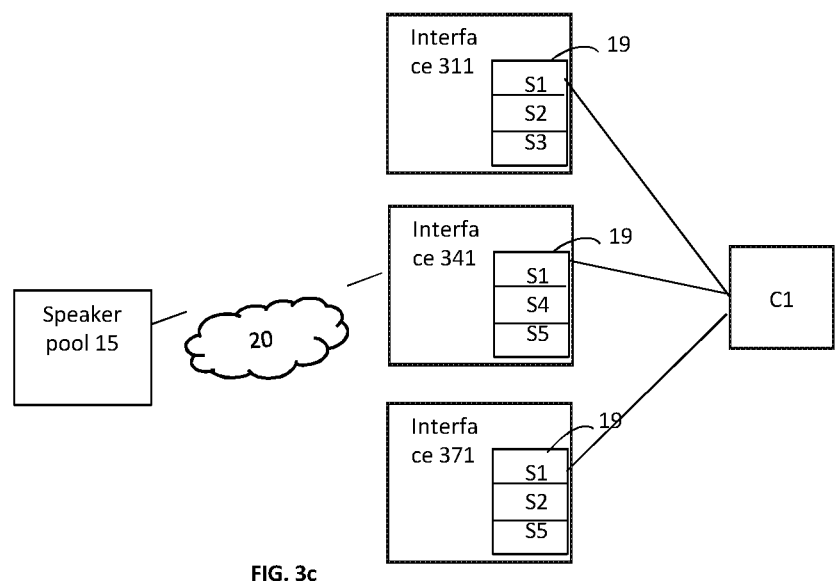
FIG. 3C depicts a third exemplary embodiment of the present disclosure.

FIG. 3C depicts a third exemplary embodiment of the present disclosure. In this embodiment, interfaces 311, 341 and 371 display respective speaker pools in the hook 19 based upon the speaker selection of the speaker-feeder module 204. Hook 19 in interface 311 presents speakers S1, S2 and S3 and corresponding discussion session(s). Hook 19 in interface 341 presents speakers S1, S4 and S5 and corresponding discussion session(s). Hook 19 in interface 371 presents speakers S1, S2 and S5 and corresponding discussion session(s). Visitor C1 explores the speakers and/or discussion sessions via the hook 19 provided on interfaces 311, 341 and 371 respectively. The participant interaction module 208 enables the visitor C1 to select a particular discussion session of the speaker S1 displayed on the interfaces 311, 341 and 371. Further, the visitor C1 may select same or different time slots provided on the interfaces 311, 341 and 371 for the selected discussion session.

The participant interaction module 208 receives the selection of the visitor C1 via the respective hook 19 to connect with the speaker S1. The participant interaction module 208 receives the discussion session preference selected by the visitor C1 along with the time slot for the discussion session. The discussion module 210 tracks the discussion session schedule selected by the visitor C1 and triggers the communication module 212 to connect the visitor C1 to the selected discussion sessions of speaker S1 as per the schedule.

Figure 3D:
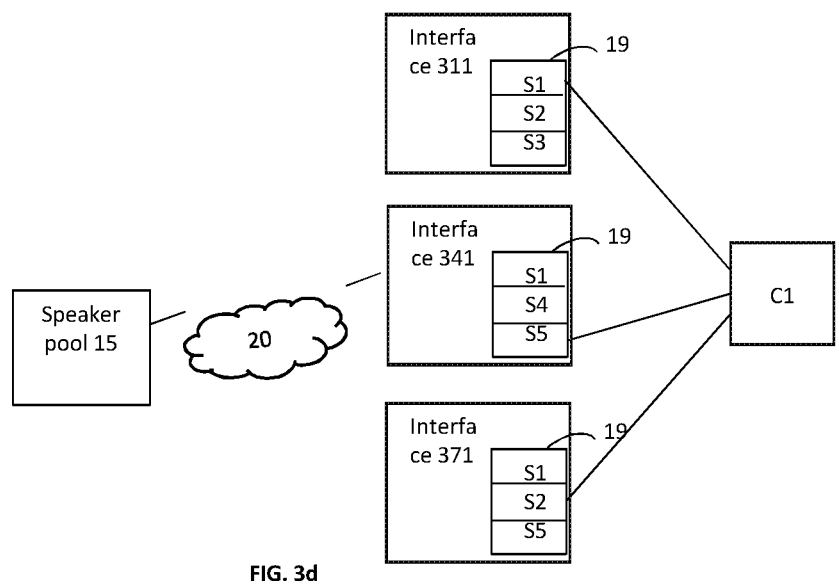
FIG. 3D depicts a fourth exemplary embodiment of the present disclosure.

FIG. 3D depicts a fourth exemplary embodiment of the present disclosure. In this embodiment, interfaces 311, 341 and 371 display respective speaker pools in the hook 19 based upon the speaker selection of the speaker-feeder module 204. Hook 19 in interface 311 presents speakers S1, S2 and S3 and corresponding one or more discussion sessions. Hook 19 in interface 341 presents speakers S1, S4 and S5 and corresponding one or more discussion sessions. Hook 19 in interface 371 presents speakers S1, S2 and S5 and corresponding one or more discussion sessions. Optionally, interfaces 311, 341 and 371 display a discussion session with S1, S2 and S5 as the speakers. The visitor C1 explores the profiles and corresponding one or more discussion sessions of the speakers in the hook 19 provided on interfaces 311, 341 and 371 respectively and/or the discussion sessions.

The visitor C1 wishes to connect with the speaker S1 on interface 311, the speaker S5 on interface 341 and the speaker S2 on interface 371. The participant interaction module 208 enables the visitor C1 to select speakers S1, S5 and S2 via the respective hooks 19. Further, the participant interaction module 208 enables the visitor C1 to select one or more discussion sessions of each of the selected speakers S1, S5 and S2. The discussion module 210 tracks the discussion session schedules selected by the visitor C1 and triggers the communication module 212 to connect the visitor C1 to the selected discussion sessions as per the schedule.

In either of the above embodiments, using the participant interaction module 208, a participant can send a one-to-one request to the speaker after the discussion session. This may enable the participant and speaker to strengthen their mentor/trainee relationships, check on continued progress reports, for more advice, or the like.

Figure 4A:
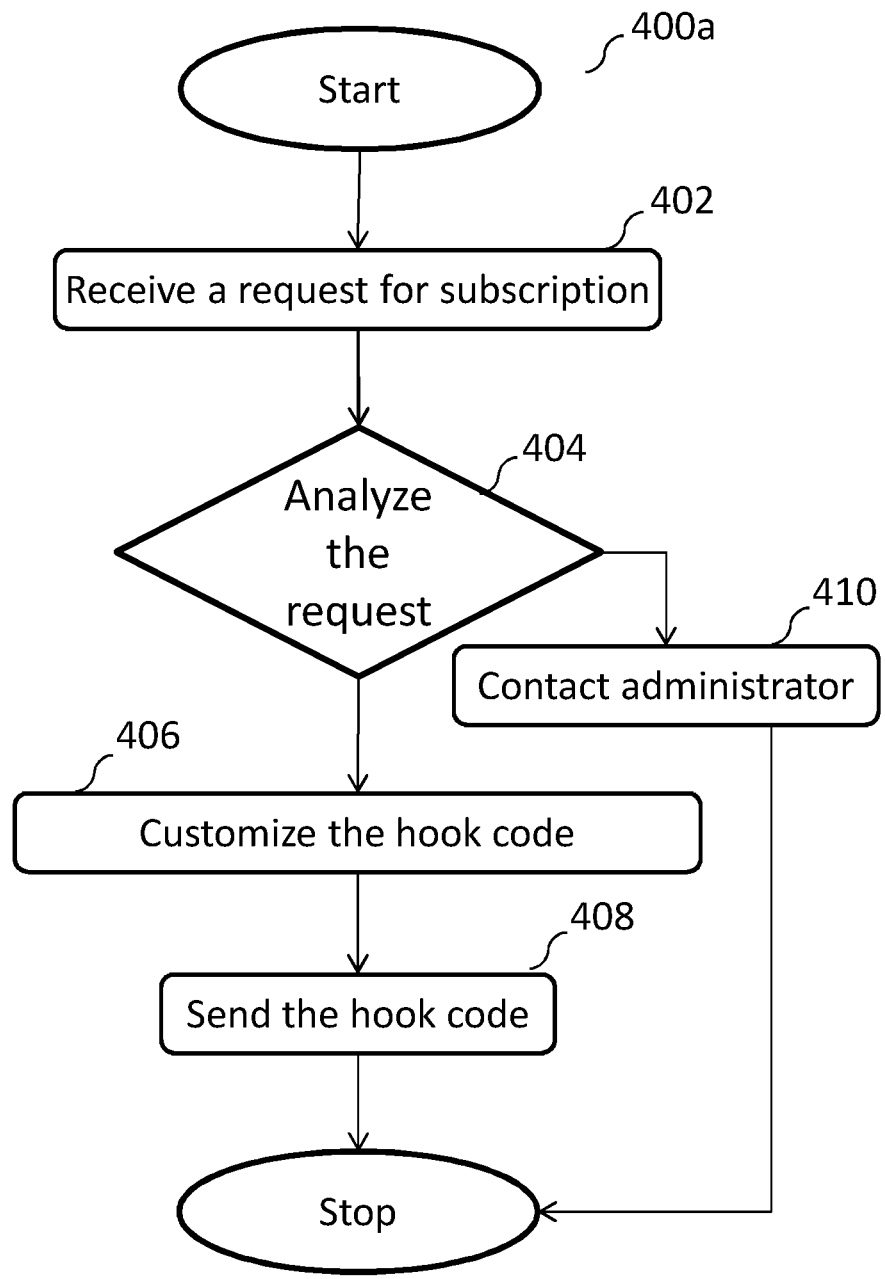
FIG. 4A illustrates an exemplary flowchart 400a depicting steps relating to a subscription process of the speaker pool.

FIG. 4A illustrates a flowchart 400a depicting steps relating to subscription to a speaker pool of the speaker pool module 15. At step 402, an administrator of the interface 341 communicates with the main server 1 requesting a subscription to a speaker pool of the speaker pool module 15. The administrator may access the interface 11 and fill a request form seeking details required for subscription. The request form may include without limitation, the URL or other internet address of the interface 341, name of the entity, type of subscription requested, setting preferences as outlined in FIG. 2, payment details, or the like. The settings module 202 may receive the request and analyze the information received at step 404. In case no active hook 19 for the interface 341 is found, the settings module 202 may create an entry in the database 206 to store information about the interface 341 and customize the hook code as per settings requested by the administrator to be embedded with the interface 341 at step 406.

At step 408, the settings module 202 sends the hook code to the web server 34 which the administrator embeds in the interface 341 for example via email. In one embodiment, the administrator embeds the hook code successfully if the email domain is same as the domain of the interface where the hook 19 is being embedded. Once the hook code is embedded in the code of the interface 341, whenever the interface 341 is accessed, the hook 19 is displayed in the interface 341 as per the settings defined by the administrator. In an embodiment, the administrator may make changes to the hook settings any time after embedding the hook code.

However, if during analysis in step 404, the settings module 202 finds an active hook for the interface 341 or chosen program, the settings module 202 prompts the administrator to send the request to the administrator of the existing active hook for becoming an administrator of the hook 19 of the interface 341 at step 410.

Figure 4B:
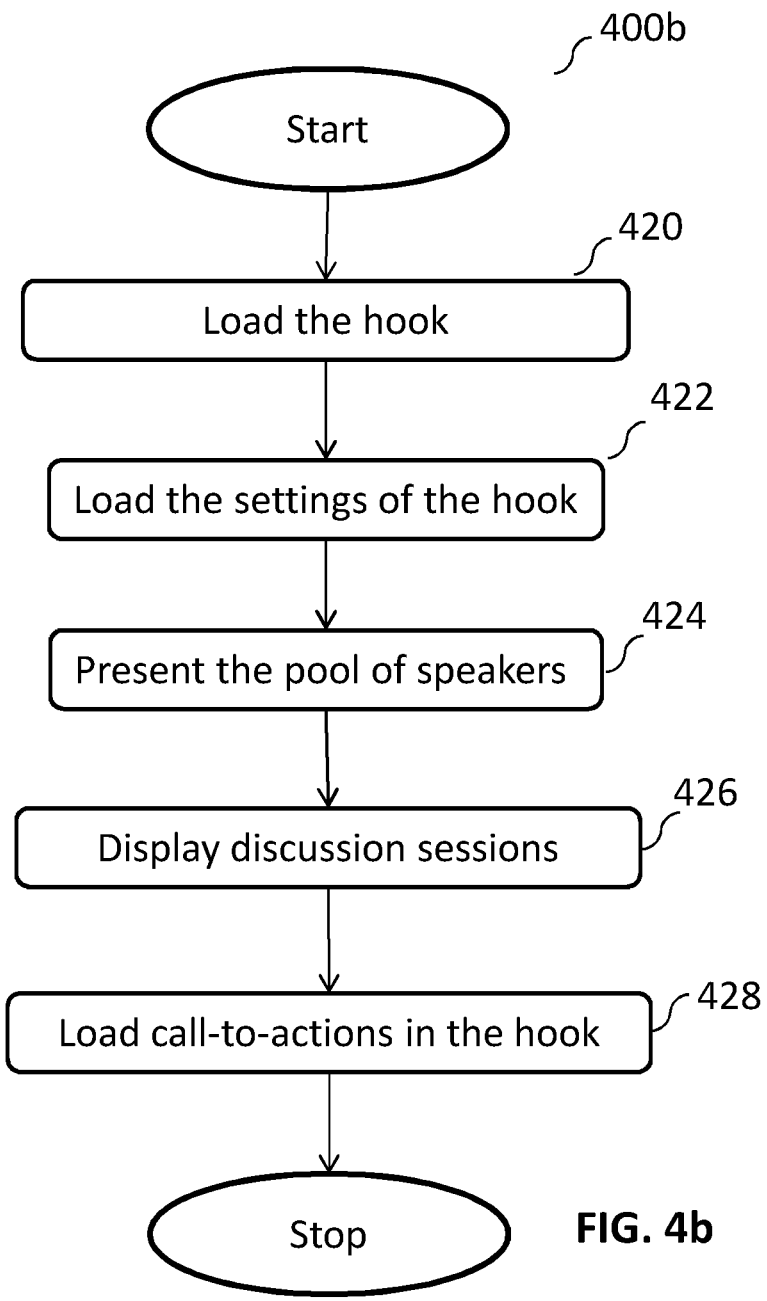
FIG. 4B illustrates an exemplary flowchart 400b depicting steps relating to loading of the hook featuring multiple speakers.

FIG. 4B illustrates a flowchart 400b depicting steps relating to loading of the hook 19 featuring multiple speakers. Once the interface 341 is loaded, at step 420, the hook 19 communicates with the interface loading module 214 to determine whether the hook code and source site's URL are correct. The interface loading module 214 checks with the database 206 whether the URL can host the hook 19. If the hook code does not match for the source interface, then the interface loading module 214 stalls the loading of the hook 19.

At step 422, the interface loading module 214 queries the database 206 the settings of the hook 19. Accordingly, the interface loading module 214 (not) loads the various settings of the hook 19 for example, hook appearance, the speaker-search box and/or advanced search features, whether a visitor can search the speakers, or the like.

At step 424, the interface loading module 214 presents the speakers as per the speaker-feeder module 204 in the hook 19 of the interface 341. The criteria used for selection by the speaker-feeder module 204 are defined by an administrator of the interface 341 in the settings module 202. The hook 19 may also show the details of speakers such as education and work credentials, and/or discussion topics.

Optionally, at step 426, the discussion module 210 checks for one or more discussion sessions of the speakers to be displayed in the hook 19. The hook 19 displays discussion sessions and/or one or more speaker details due to speak in the discussion session. The discussion sessions include the date and time of the session, the topic of the session, or the like. The speaker details include name of the speaker, a picture of the speaker, educational qualifications of the speaker, experience of the speaker, publications by the speaker, or the like.

Optionally, at step 428, the interface loading module 214 loads one or more calls-to-action in the hook 19. The call-to-actions include for example, a user interface element (for example, a button) to apply to a job, an educational opportunity, submit a request for a speaking session opportunity, add a job or educational opportunity, submit an article, provide feedback, a rating, add to favorites, invite a user, or the like. In an embodiment, the calls-to-action are provided in the hook 19 without being linked to a speaker. The participant interaction module 208, in certain embodiments, may determine whether a visitor (e.g., a user) has selected a call-to-action (e.g., clicked a call-to-action, touched a call-to-action on a touchscreen, highlighted a call-to-action and pressed a predefined key or key combination such as an "enter" key, or the like).

Figure 4C:
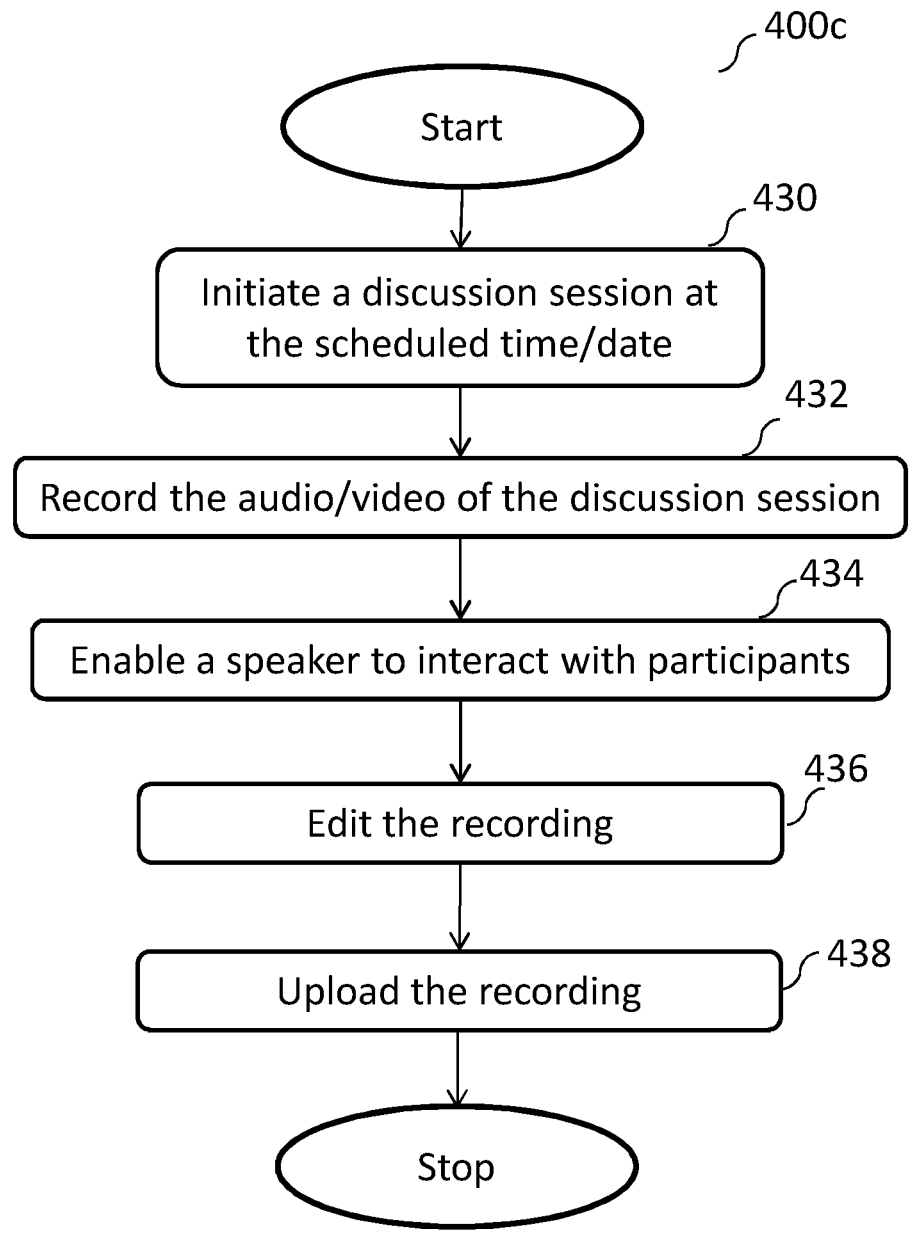
FIG. 4C illustrates an exemplary flowchart 400c depicting steps relating to a conferencing procedure of the speaker pool.

FIG. 4C illustrates a flowchart 400c depicting a conferencing procedure of the speaker pool module 15. At step 430, the communication module 212 initiates a discussion session at the scheduled date and time as directed by the discussion module 210.

At step 432, the discussion module 210 triggers the recording module to initiate recording of the discussion session. The recording module 216 records the audio and/or video of the discussion session.

At step 434, the participant interaction module 208 enables a speaker to interact with participants synchronously or asynchronously such as via audio/video conferencing system via (browsers, mobile/desktop apps, POTS), chat sessions, via messaging board, or the like. The speaker may supplement discussion slides, white-board, screen-sharing, or the like.

At step 436, the recording module 216 edits/redacts the recorded discussion between the participants and speaker(s). For example, the recording module 216 shares the recorded audio/video of the discussion session with the exclusion module 224 and/or transcription module 226 for editing. The recording module 210 allows the participants/speakers to edit the recorded discussion. Editing includes without limitation, removing a segment from the recording, mixing one or more recordings, adding sub-titles, attributions, or the like. At step 438, the recording module 216 uploads the (redacted) recording in the database 206 and/or shares the recorded discussion with the participants/speakers.

Figure 4D:
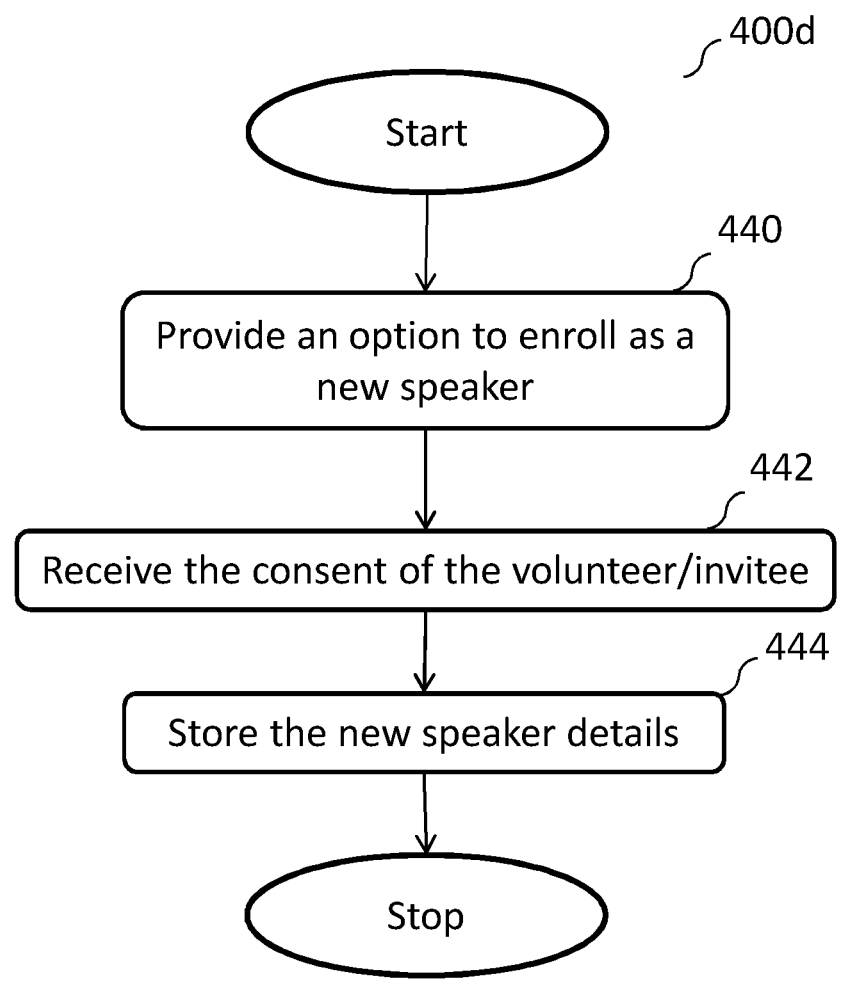
FIG. 4D illustrates an exemplary flowchart 400d depicting steps relating to an enrollment process of a new speaker in the speaker pool.

FIG. 4D illustrates a flowchart 400d for enrollment of a new speaker in a speaker pool of the speaker pool module 15. At step 440, an option to enroll as a new speaker is presented in the hook 19 of an interface along with multiple speakers to a visitor. The option may be for example, a call-to-action, which may be presented in the hook as defined in the settings module 202. The visitor may be a volunteer who landed on the interface to enroll as a new speaker or an invitee ("prospective speaker") of the interface who was invited on the interface to enroll himself/herself as a new speaker. Alternately, the invitee may be provided a code or URL to register as a speaker.

At step 442, the speaker-feeder module 204 receives the consent of the volunteer/invitee to be added as a speaker in the speaker pool. Optionally, the speaker-feeder module 204 receives one or more options of the speaker for example, to be a moderator, facilitator, or speaker in a discussion session. At step 444, the speaker-feeder module 204 stores the received details in the database 206. In an embodiment, the settings of the interface via which the new speaker details are received, are applied whenever the new speaker details are accessed by the interface. Further, the new speaker may be approved by an administrator of the source interface before being added to the speaker pool.

Figure 4E:
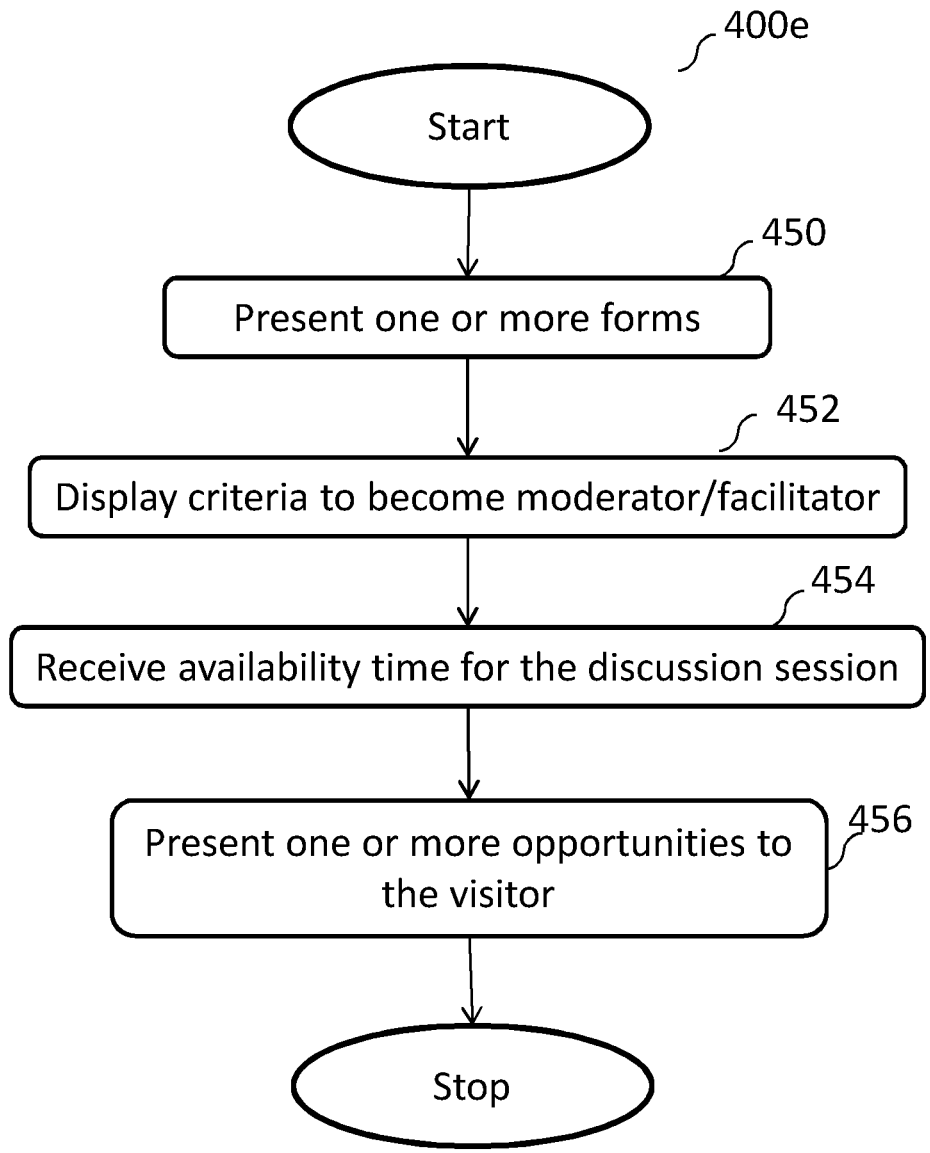
FIG. 4E illustrates an exemplary flowchart 400e relating to interaction of a visitor with the speaker pool.

FIG. 4E illustrates an exemplary flowchart 400e relating to interaction of a visitor with the speaker pool. At step 450, the hook 19 presents one or more forms to the visitor to create a profile with the speaker pool and to enable the visitor to discuss one or more topics. The forms may be configured at the time of subscribing to the speaker pool by the administrator. Alternately, the hook 19 may provide an option to the visitor to login using a social media login. The social media logins may include without limitation Facebook®, LinkedIn®, Twitter®, or the like.

Once the visitor information is received, at step 452, the hook 19 displays one or more criteria to the visitor to become a facilitator or a moderator for a discussion session. The criteria include without limitation education background, expertise on one or more topics, years of professional experience, or the like. In an embodiment, the criteria may be displayed to only those visitors whose profile information matches preferences of the administrator. Such preferences may be provided by the administrator at the time of subscription to the speaker pool.

Additionally and optionally, at step 454, the hook 19 enables the visitor to specify his/her availability time for the discussion session and/or any other information the visitor may wish to share. In an embodiment, the information provided by the visitor and received via the hook is shared in real-time with the administrator of the interface.

Additionally and optionally, at step 456, one or more opportunities may be presented to the visitor in the hook 19. The opportunities include for example, giving additional privileges to the visitor on managing user submitted content, one or more job opportunities, or the like. In an embodiment, a call-to-action for example applying to a job, applying to an educational opportunity, submitting a request for a speaking session opportunity, adding a job or educational opportunity, submitting an article, providing feedback, providing a rating, adding to favorites, and inviting a user may be provided to the visitor.

From the above, it is evident that the present disclosure offers several advantages for example, an interface administrator enjoys synergies due to collective effort, onus of finding speakers is distributed, speakers are presented to visitors without having to recruit speakers, and increased throughput of the service. From a speaker's perspective, the teachings of the present disclosure provide a speaker wider visibility, more worth of their time and reach while a visitor gets wider selection of speakers. Thus, speaker pool helps in identification of knowledgeable persons, reaching out to them, convincing them to participate in discussions, get their consent to do so, and promotes such discussion opportunities via third parties.

It should be noted that the above steps are exemplary steps and the order of execution of the steps may be altered or one or more steps may be omitted or other steps can be clubbed to the outlined exemplary steps. Such variations are within the scope and teachings of the present disclosure.

It should be noted that the teachings of the present disclosure can be applied individually or features of various embodiments described above may be combined together. Such variations are within the scope and spirit of the present disclosure. For example, in one embodiment, depending upon subscription, only one-to-one access with speakers may be feasible. This can be extended to incorporate panel discussions, where multiple speakers may discuss one or more topics with one or more participants.

It will be appreciated that variations of the above disclosed and other features and functions, or alternatives thereof, may be desirably combined into many other different systems or applications. Also, that various presently unforeseen or unanticipated alternatives, modifications, variations or improvements therein may be subsequently made by those skilled in the art which are also intended to be encompassed by the following claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for a speaker pool, the method comprising:
   receiving electronic consent from a plurality of speakers over an interface with a third party, the consent for the speakers to join a speaker pool stored at a server that comprises a plurality of individuals who have consented to discuss one or more topics in response to a request from a visitor of the third party;
   receiving a subscription request for the speaker pool from an administrator of an interface where the speaker pool will be presented;
   sending a hook for the speaker pool to a domain, the hook comprising embeddable code for enabling the interface to communicate with the server to access the speaker pool, the hook successfully embedded in the interface in response to the domain where the hook was sent matching the domain for the interface;
   defining configuration settings at the server for the hook embedded within the interface based on input from the administrator, the configuration settings defining how the speakers are presented in the interface and actions that the visitor can perform in the interface in relation to the presented speakers;
   receiving from the third party via the hook in the interface, criteria for selecting one or more speakers from the speaker pool, the criteria specifying one or more characteristics of a desired speaker; and
   electronically displaying the selected one or more speakers from the speaker pool to the visitor of the third party using the hook in the interface based on the received criteria and the configuration settings defined for the hook.

2. The method of claim 1, further comprising:
   enabling the third-party to invite a prospective speaker to participate in at least one discussion session and to solicit the prospective speaker's consent for participation by providing to the prospective speaker, at least one of the interface, a uniform resource locator (URL), and a code;
   receiving the prospective speaker's consent for the prospective speaker to join the speaker pool; and
   adding the prospective speaker to the speaker pool in response to receiving the prospective speaker's consent.

3. The method of claim 1, further comprising:
   enabling the third-party to receive a volunteer's consent to participate in at least one discussion session;
   receiving approval of the volunteer from the third-party over the interface; and
   adding the volunteer as a speaker in the speaker pool in response to receiving the approval from the third-party.

4. The method of claim 1, further comprising receiving configuration data from the third-party over the interface, the configuration data indicating whether to allow the visitor to search the one or more speakers using the hook.

5. The method of claim 1, further comprising disabling the hook in response to a failure to satisfy one or more interface loading settings for the hook.

6. The method of claim 1, further comprising, in response to the visitor selecting a speaker in the hook in the interface, presenting corresponding speaker details in a second hook in a second interface, wherein the second interface is provided through a different party which one of invited and approved the one or more speakers to the speaker pool.

7. The method of claim 1, further comprising at least one of:
   enabling the visitor to select multiple discussion sessions with a single speaker in the interface of the third-party;
   enabling the visitor to select multiple discussion sessions with multiple speakers in the interface of the third-party;
   enabling the visitor to select a same discussion session with a same speaker in multiple different third-party interfaces; and
   enabling the visitor to select multiple discussion sessions with multiple speakers in multiple different third-party interfaces.

8. The method of claim 1, further comprising providing an electronic discussion session between at least one of the one or more speakers and one or more additional visitors in response to the one or more additional visitors requesting access to the selected discussion session via at least one of an in-person meeting, a video conference, an audio conference, and a message exchange.

9. The method of claim 1, further comprising outbound dialing a phone of the visitor to provide access to a selected discussion session in response to the visitor failing to join the selected discussion within a predetermined time.

10. The method of claim 1, further comprising:
    recording a discussion session between the visitor and at least one of the one or more speakers;
    receiving a request to redact one or more portions of the recorded discussion session;
    redacting the one or more portions of the recorded discussion session; and
    publishing the recorded discussion session without the redacted one or more portions.

11. The method of claim 1, further comprising:
    recording a discussion session between the visitor and at least one of the one or more speakers;

providing an interface for a user to transcribe the recorded discussion session;

receiving a transcription of the recorded discussion session from a user through the provided interface; and providing the received transcription to one or more other users.

12. The method of claim 1, wherein the received criteria comprises one or more of a speaker's source for joining the speaker pool, a speaker's work history, a speaker's educational history, a speaker's skill, a speaker's area of expertise, other content published on the third-party interface, and an internet address of the third-party interface.

13. The method of claim 1, further comprising determining an order in which the selected one or more speakers are electronically displayed based on a comparison of the selected one or more speakers to the visitor, wherein the comparison is based on one or more of a location, an ethnicity, a gender, an educational detail, a work detail, and a skill.

14. The method of claim 1, further comprising:

presenting a call-to-action including at least one of applying for a job, applying for an educational opportunity, submitting a request for a speaking session opportunity, adding a job opportunity, adding an educational opportunity, submitting an article, providing feedback, providing a rating, adding to favorites, and inviting a user; and completing the call-to-action in response to the visitor completing one or more predefined conditions set by the third-party.

15. The method of claim 1, further comprising prompting the visitor with an opportunity for fulfillment of a predefined action, the opportunity comprising one or more of:

inviting the visitor to a discussion session as one of a speaker, a moderator, and a participant;

giving the visitor one or more additional privileges for managing user submitted content; and a job opportunity.

16. An apparatus for a speaker pool, the apparatus comprising:

a processor; and a memory that stores code executable by the processor to:

receive a subscription request for a speaker pool from an administrator of an interface where the speaker pool will be presented, the speaker pool comprising a plurality of individuals who have consented to discuss one or more topics in response to a request from a visitor of the third party;

send an embeddable hook for displaying the speaker pool to a domain, the hook comprising embeddable code for enabling the interface to communicate with a server to access the speaker pool, the hook successfully embedded in the interface in response to the domain where the hook was sent matching the domain for the interface;

define configuration settings at the server for the hook embedded within the interface based on input from the administrator, the configuration settings defining how the speakers are presented in the interface and actions that the visitor can perform in the interface in relation to the presented speakers;

determine that a visitor has selected a call-to-action from the embeddable hook; and present one or more forms corresponding to the selected call-to-action to obtain information associated with the speaker pool from the visitor.

17. The apparatus of claim 16, wherein the code is further executable by the processor to enable an administrator of the hook to specify one or more of a number of forms and a number of questions to be asked to the visitor in response to the visitor selecting the call-to-action.

18. The apparatus of claim 16, wherein the code is further executable by the processor to provide information about the visitor to the third-party, the third-party administering the interface in which the hook is embedded.

19. A system for a speaker pool, the system comprising:

a first hardware server that:

receives a subscription request for a speaker pool from an administrator of an interface where the speaker pool will be presented, the speaker pool comprising a plurality of individuals who have consented to discuss one or more topics in response to a request from a visitor of the third party;

sends a hook for the speaker pool to a domain, the hook comprising embeddable code for enabling the interface to communicate with the first hardware server to access the speaker pool, the hook successfully embedded in the interface in response to the domain where the hook was sent matching the domain for the interface; and defines configuration settings at the first hardware server for the hook embedded within the interface based on input from the administrator, the configuration settings defining how the speakers are presented in the interface and actions that the visitor can perform in the interface in relation to the presented speakers; and a second hardware server that selects the one or more speakers of the speaker pool for display within the webpage based on a determined location for the user in response to the user visiting the webpage and that provides the one or more speakers for display within the webpage using the hook in the speaker pool interface based on the configuration settings defined for the hook, the user selecting a speaker from the displayed one or more speakers for a discussion session between at least the user and the selected speaker.

20. The system of claim 19, wherein a computing device of the user comprises a sensor, the computing device of the user providing the determined location for the user to the second hardware server based on information from the sensor, the computing device providing the determined location using the hook in the speaker pool interface through the webpage, the sensor comprising one or more of a global positioning system (GPS) sensor, a wireless communications adapter, a network adapter, an accelerometer, a compass, and a gyroscope.

* * * * *